3,048,540
CARBON BLACK THICKENED GREASES
Du Bois Eastman and Roger M. Dille, Whittier, Calif., Wesley V. Taylor, Jr., Beacon, and Fred C. Toettcher and Terence B. Jordan, Fishkill, N.Y., assignors to Texaco Inc., New York, N.Y., a corporation of Delaware
No Drawing. Filed May 28, 1959, Ser. No. 816,362
4 Claims. (Cl. 252—29)

This invention relates to improved lubricating greases thickened with carbon black. More particularly it relates to carbon black thickened greases of superior stability and other lubricating properties obtained in improved yields by employing a carbon black of a special type as the thickening agent.

The carbon blacks which are employed in the compositions of this invention are products obtained in the reaction of normally liquid hydrocarbons with oxygen and steam under conditions such that a gas comprising carbon monoxide and hydrogen is obtained as the chief reaction product and only a small proportion of the total carbon present in the oil is converted into carbon black. The carbon blacks produced in this manner are composed of porous particles connected together in a reticulate branched chain structure, generally having a high ash content and distinguished particularly by their very low bulk density and by their strongly surface active and hydrophilic character.

We have found that these carbon blacks have very special utility as greast thickening agents, very unexpectedly forming greases having high water resistance in addition to the other properties required in a superior steel mill grease. The greases thus produced are very stable and resistant to separation of oil and thickener, and are obtained in improved yields in comparison with other carbon black thickened greases of the prior art.

The compositions of this invention comprise a lubricating oil as the chief component and a minor amount, sufficient to thicken the lubricating oil to a grease consistency, of a carbon black of the character described above. Ordinarily the composition will comprise from about 5 to about 25 percent by weight of carbon black. The preferred greases of this invention comprise about 8 to about 15 percent by weight of carbon black.

The carbon blacks are obtained by the method described in the co-pending co-owned application of du Bois Eastman, Serial No. 568,963, filed March 2, 1956, now U.S. Patent No. 2,914,418, which comprises carrying out an autogenous non-catalytic reaction of a normally liquid hydrocarbon with oxygen and steam so as to obtain only about 0.1 to about 1.0 pound of carbon black per gallon of oil, amounting to about 0.5–10 percent of the carbon present in the hydrocarbon. The reaction is suitably carried out at temperatures from about 2000° F. to about 3200° F., preferably at 2500–2900° F., and under pressures ranging from atmospheric up to about 1000 pounds per square inch gauge, preferably in the range 100–600 pounds per square inch, with the reactants employed in suitable proportions to maintain the reaction temperature autogenously. Suitable reactant proportions are within the range 0.6–1.3 pounds of oxygen and 0.2–1.5 pounds of steam per pound of oil. The reactants may be preheated, if desired, the oil and steam preferably being at a temperature of about 600–1200° F. and the oxygen at a lower temperature.

The carbon blacks obtained as described above are very different materials from the conventional furnace blacks, including the acetylene blacks which have been employed heretofore as grease thickening agents. They differ from other carbon blacks generally in their high ash content, which is usually above 1.0 percent by weight, although a lower ash content may be obtained when the black is produced from a hydrocarbon containing only a small metal content. The ash content may be as high as about 20 percent by weight, depending upon the metal content of the hydrocarbon reactant and also upon the salt content of the wash water when the carbon black is recovered by water washing the effluent generator gases. When a substantially pure wash water is employed or when other means are employed for recovering the carbon black, the ash content will ordinarily be from about 1 to about 10 percent by weight. The metals contained in the ash include chiefly sodium, potassium, calcium, iron, vanadium and nickel.

Aside from their high ash content, these carbon blacks appear to be most nearly related to the medium or high color channel blacks in their structure and composition. They are composed of particles about 25–45 millimicrons in diameter, having a surface area of at least about 120 square meters per gram, and ordinarily about 175–750 square meters per gram. They normally have a pH in about the range 4–5, but this may be somewhat higher, such as up to about 6, when the carbon black contains above about 10 percent of ash having a relatively high proportion of alkali metal or alkaline earth metal oxides. They have a relatively high volatile content of about 2–7 percent, ordinarily about 3–6 percent by weight. They are highly surface active, having a strong affinity for both gases and water, being markedly different in this respect from acetylene black, which is only difficultly wet by water. These blacks are furthermore distinguished from other carbon blacks generally by their low bulk density, below about 1.0 pound per cubic foot, and ordinarily from about 0.3 to about 1.0 pound per cubic foot. They are also distinguished from other carbon blacks generally by their property of settling when mixed with water to a concentration of only about 0.5 to 1 percent by weight, as compared with a concentration of about 6 percent by weight with channel blacks and about 10 percent by weight with other furnace blacks.

A representative carbon black of the above type which is suitable for use in accordance with our invention has a particle size of about 27 millimicrons, a surface area of 585 square meters per gram, a pH of 4, a volatile content of about 3.4, and an ash content of 5.96 percent, the ash comprising chiefly iron, vanadium and nickel as the metal components, as shown by spectrographic analysis. It has a specific gravity of 1.391 and a bulk density of 3.5 pounds per cubic foot. It is strongly hydrophilic, absorbing about 80 percent of its weight of water when stored in air for about 12 days. This carbon black is prepared by reacting a heavy bunker C fuel oil having a gravity, ° API, of 13.5 and containing 85.1 percent of carbon, with oxygen and steam in a flow type generator of the type described in U.S. Patent 2,582,938. The reaction is carried out at about 2600° F. and 400 pounds per square inch gauge pressure, employing oil and steam preheated to 750° F. and oxygen preheated to 300° F., with an oil feed rate of 4021 pounds per hour, a steam feed rate of 1899 pounds per hour and an oxygen feed rate of 50.3 standard cubic feet per hour. The reaction products comprise carbon monoxide and hydrogen and a small amount of carbon black, amounting to 2 percent of the total carbon contained in the oil. The carbon black is removed from the product gases by washing with substantially mineral free water, and the carbon black recovered by evaporating off the water.

The bulk density of the carbon black is determined by measuring the volume occupied by a weighed sample after rolling and inverting in a standard laboratory cylinder. The sample is prepared by drying in an oven overnight at 220° F. and then pulverizing the dried material in a Waring Blendor.

Various additives of the types commonly employed in lubricating greases may be present in these greases, such as oxidation inhibitors, corrosion inhibitors, extreme pressure improvers, antirust agents, and so forth. Very suitable anti-oxidants include those of the amine type, such as diphenylamine, alpha- and beta-naphthylamines, diphenyl-paraphenylenediamine, etc. In addition, other thickening agents may also be present such as other finely divided solids of various types and conventional fatty acid soaps.

In addition to or in place of an oxidation inhibitor in the composition, the carbon black may be acid treated so as to reduce its ash content before employing it in the grease preparation. We have found that such a treatment of these carbon blacks produces a large improvement in the oxidation resistance of the grease. The acid treatment is suitably carried out employing a dilute mineral acid, such as an aqueous hydrochloric acid solution, and under conditions such that the ash content is reduced to below about 5 percent by weight, and preferably to below about 4 percent by weight.

With special advantage, the additive combination comprising a sulfurized fatty oil and a wax oxidate, disclosed in the co-pending co-owned application of Herbert J. Pitman, Serial No. 744,293, filed January 24, 1958, is employed in these greases. While the special carbon blacks which are employed in accordance with this invention provide greases of superior stability and improved yields, these greases have a disadvantage in common with other carbon black thickened greases generally in that they show a relatively poor response to extreme pressure additives of the usual types employed in lubricating greases, and are also lacking in rust protectiveness. We have found that by employing suitable amounts of sulfurized fatty acid oil and wax oxidate, both very high extreme pressure properties and also high rust preventiveness can be imparted to these greases. The sulfurized fatty oil employed in this additive combination may be sulfurized castor oil, sulfurized lard oil, sulfurized sperm oil, sulfurized fish oils. etc., containing about 5–15 percent by weight of sulfur. The oxidate is a highly oxidized wax oxidate having a neutralization number of at least about 200 and a neutralization number to saponification number ratio of at least about 0.5, or a fraction of such an oxidate obtained, for example, by water washing, having a neutralization number of at least about 150. The sulfurized fatty oil is employed in the grease in an amount of about 3–15 percent by weight, and the oxidate is employed in an amount of about 2–10 percent by weight. With this additive combination there is preferably employed also a small amount, such as about 0.5–5 percent by weight, of tricresyl phosphate. We have found that the latter material prevents deposit formation and staining which tends to occur in bearing lubrication under certain conditions with the carbon black thickened greases containing sulfurized fatty oils and wax oxidate.

The oleaginous liquid forming the major constituent of these greases may be any oils of lubricating characteristics which are suitable for use in lubricating greases generally. Such oils include the conventional mineral lubricating oils and also synthetic lubricating oils prepared by cracking and polymerizing products of the Fischer-Tropsch process and the like, as well as other synthetic oleaginous compounds such as polyesters, polyethers, silicones, etc., having viscosities within the lubricating oil viscosity range. Examples of such compounds are the aliphatic dicarboxylic acid diesters, such as di-2-ethylhexyl sebacate, di(secondary amyl)sebacate, di-2-ethylhexyl azelate, di-isooctyl adipate, etc., and silicone oils such as methylchlorophenyl silicone polymers. Suitable mineral oils are those having Saybolt Universal viscosities in the range from about 75 seconds at 100° F. to about 225 seconds at 210° F., which may be either naphthenic or paraffinic in type, or blends of different oils. The preferred oils are those having Saybolt Universal viscosities in about the range from about 600 seconds at 100° F. to about 100 seconds at 210° F., which may be blends of lighter and heavier oils in the lubricating oil viscosity range.

The wax oxidates employed in accordance with this invention are produced by the method which comprises blowing air through a paraffin wax charge while the charge is maintained at an elevated temperature in the range from about 200° F. to about 400° F. and under an increased pressure in the range from slightly above atmospheric up to about 500 pounds per square inch, with an air feed rate from about 10 to about 60 cubic feet of air per hour per pound of wax charge, until an oxidized product having a neutralization number in about the range 200–550 is obtained. Suitable feed stocks for this reaction are waxes separated from paraffinic distillate oils such as a crude scale wax or slack wax, preferably containing not more than about 20 percent by weight of oil, and most advantageously containing not more than about 10 percent by weight of oil. The reaction is preferably carried out at a temperature in about the range 250° F.–350° F., most suitably in about the range 270° F.–330° F., and under a pressure in about the range 30–300 pounds per square inch, most suitably in about the range 50–250 pounds per square inch gauge. An oxidation catalyst is preferably employed when the reaction is carried out at pressures below about 100 pounds per square inch or when the wax charge contains more than about 5 percent by weight of oil. The preferred catalyst is a metal permanganate, most suitably potassium permanganate, which may be employed in an amount from about 0.01 to about 1.5 percent by weight of the wax charge. The oxidized product thus obtained may be employed in crude form or it may be water washed before use to remove lower molecular weight oxygenates, containing about 1–3 carbon atoms per molecule, which results in a lowering of the neutralization number to within about the range 150–350.

The grease preparation may be carried out by mixing together the oleaginous liquid and the carbon black and dispersing the carbon black in the liquid merely by stirring when the carbon black is in a disintegrated and uncompressed form. When the carbon black is in the form of a cake, such as is obtained by drying a water slurry of the material, it is ordinarily necessary to mill the oil and carbon black mixture in order to obtain a uniform dispersion of the solid particles. When the carbon black is obtained in the form of a water slurry, the grease preparation may be carried out by mixing the water slurry with the oil so as to obtain a transfer of the carbon black into the oil phase. Any additives employed in the grease may be added either initially or at any time before or during a shearing operation.

The following examples are given for the purpose of further disclosing the invention.

EXAMPLE I

A lubricating grease of this invention has the following composition in percent by weight:

Carbon black _____ 9.4–12.4
Lubricating oil _____ Remainder

The carbon black is a material of the type described hereinabove. A very suitable material is that described particularly having a surface area of 585 square meters per gram. Another suitable, although less preferred, material of this type has a surface area of 150 square meters per gram and contains 3.8 percent of ash. It is obtained substantially in the manner described above except that the reaction is carried out so as to convert about 4 percent of the total carbon present in the coil into carbon black.

The lubricating oil is a mixture in about a 3:2 ratio of a refined naphthenic residual oil having a Saybolt Universal viscosity of 156 at 210° F., and a refined paraffinic distillate oil having a Saybolt Universal viscosity of about 176 at 100° F.

The grease preparation is carried out by mixing together the dried carbon black and lubricating oil in the indicated proportions by weight and passing the mixture once through a Premier Colloid mill at 0.002 inch clearance. N.L.G.I. No. 2 grade greases of smooth buttery texture are obtained.

The following table shows the grease yields obtained from the special carbon blacks as described above in comparison with that obtained with a commercial channel carbon black of similar type, having a reticulate branched chain structure, a particle diameter of about 16 millimicrons, a surface area of 281 square meters per gram, a pH of about 4.9 and a volatile content of about 5 percent by weight.

*Table I*

| Carbon black, type | Special | Special | Commercial channel black |
|---|---|---|---|
| Surface area of carbon black, M²/g | 585 | 150 | 281 |
| Carbon black in grease, percent | 10.4 | 12.4 | 16.0 |
| ASTM pene. of grease at 77° F.: | | | |
| Unworked | 207 | 250 | 202 |
| Worked, 60 strokes | 276 | 272 | 283 |

As shown by the data given in the above table, the special carbon blacks which are employed as grease thickening agents in accordance with this invention produce greases in much higher yields than do similar carbon blacks of the prior art. The grease yields obtained vary somewhat according to the surface area of the blacks, the higher surface areas producing higher grease yields. However, as compared with other carbon blacks, these special blacks produce higher grease yield even with a lower surface area.

In addition to the improved yield, these greases have very superior working stability and water resistance properties, as shown by the following test results, obtained upon the above grease thickened with 10.4 percent by weight of the special carbon black having a surface area of 585 square meters per gram.

ASTM worker test:
    Penetration at 77° F.—
        Worked, 60 strokes _____ 276
        Worked, 10,000 strokes _____ 283
Dropping point, °F. _____ 500+
Dynamic water resistance test:
    Loss, percent _____ 0; 0
Water absorption test:
    Water absorbed, percent _____ 25
    Penetration of emulsion _____ 275
ASTM bomb oxidation test:
    100 hr. at 210° F., pressure drop, lbs. _____ 21; 27
ASTM wheel bearing test:
    AXS-1574, leakage, g. _____ 1.0
    Georgi, leakage, g. _____ 4.0
    U.S. Steel, leakage, percent _____ 1.6
Simplified wheel bearing test, 24 hr.:
    Leakage, g. _____ 0
    Overall rating _____ Excellent
Torque breakdown test:
    10 hr. at 300° F., leakage, percent _____ 0
    3 hr. at 425° F., leakage, percent _____ 0

The dynamic water resistance test measures the resistance of a grease to being washed out of a ball bearing in the presence of water. It is carried out as described in U.S. Patent 2,528,373, column 13, lines 25–43. The water absorption test is described in the Army and Navy specification AN-G-3a (Amendment of March 1943). It consists essentially of working small increments of water (5%) into a 20 gram sample of the grease until no further increments can be worked into the grease within 5 minutes. As shown by the data, the carbon black thickened grease was highly resistant to washing away by water in the dynamic water resistance test, being strikingly different in this respect from greases thickened with strongly hydrophilic solids of other types, such as silica gel, which give a 100 percent loss in this test. It also absorbed only a small amount of water in the water absorption test, with no significant change in penetration due to the absorbed water. It was also outstanding in its stability against breakdown and separation of oil and thickener both in the ASTM worker test and in the bearing tests wherein the grease is subjected to shearing under pressure.

EXAMPLE II

A lubricating grease representative of a preferred embodiment of this invention is prepared from an acid treated carbon black and has the following composition in percent by weight:

Carbon black _____ 7.8
Lubricating oil _____ Remainder

The carbon black is that described in Example I having a surface area of 585 square meters per gram which has been washed with dilute aqueous hydrochloric acid to reduce its ash content. The washing is carried out by stirring 325 grams of carbon black with 4000 milliliters of 1 percent aqueous hydrochloric acid at 80° F. for 30 minutes. The carbon black is then filtered off and washed with water. By this treatment the ash content of the carbon black is reduced from the original 5.96 percent to 3.15 percent.

The lubricating oil employed in this grease is that described in Example I.

The grease preparation is carried out as described in Example I. A grease having an ASTM penetration at 77° of 332 unworked and 343 worked is obtained. It has substantially improved oxidation resistance as compared with the grease thickened with the untreated carbon black as shown by the following table:

*Table II*

| Grease | Example I | Example II |
|---|---|---|
| ASTM Bomb Oxidation Test—100 hr. at 210° F., pressure drop, lbs | 24 | 14 |

EXAMPLE III

An extreme pressure lubricating grease representative of a preferred embodiment of this invention has the following composition in percent by weight:

Carbon black _____ 7.9
Sulfurized lard oil _____ 10.0
Wax oxidate _____ 7.5
Tricresyl phosphate _____ 1.0
Lubricating oil _____ Remainder The sulfurized lard oil is a product obtained by heating lard oil with sulfur in the conventional manner. Typical tests upon this material include a gravity, degrees API, of 12.8, a Saybolt Universal viscosity at 210° F. of 258 seconds and a sulfur content of 7.73 percent.

The wax oxidate has a neutralization number of 221 and a saponification number of 360. It is a water washed fraction of an oxidate having a neutralization number of 343 and a spaonification number of 515, obtained by oxidizing a semi-refined 125–127° F. melting point wax containing about 0.4 percent of oil from a paraffinic distillate fraction. The oxidation is carried out by passing air through the wax containing 0.4 percent by weight of potassium permanganate at 270° F. under a pressure of 75 pounds per square inch gauge for 11.5 hours, employing an air feed rate of about 13 cubic feet of air per hour per pound of charge.

The lubricating oil is that described in Example I.
The grease preparation is carried out by mixing together the above materials in the indicated proportions by weight and milling the mixture with two passes through a Premier Colloid mill at 0.002 inch clearance. The following typical test results are obtained upon this grease.

ASTM penetration at 77° F.:
  Unworked _____ 228
  Worked, 60 strokes _____ 287
  Worked, 100,000 strokes _____ 299
Dropping point, ° F. _____ 500+
Timken test:
  O.K. load _____ 75
  P.s.i. value _____ 23,800
Mean Hertz load, kg. _____ 43
Maximum load before weld, kg. _____ 251
Dynamic water resistance test:
  Loss, percent _____ 0
Water absorption test:
  Water absorbed, percent _____ 20
  Penetration of emulsion _____ 290
Water washing and rusting test:
  Grease in bearing, percent _____ 44
  Rusted rollers _____ 0
Simplified wheel bearing test, 24 hr.:
  Leakage, g. _____ 0
  Overall rating _____ Good
ASTM wheel bearing test:
  AXS-1574, leakage, g. _____ 0.0
  Georgi, leakage, g. _____ 4.0
  U.S. Steel, leakage, percent _____ 2.2

As shown by the above data, exceptionally high extreme pressure properties are imparted to the carbon black thickened grease by means of the combination of sulfurized lard oil and wax oxidate. Only moderate improvements in extreme pressure properties, represented by Timken O.K. loads of about 30–40, were obtained in this grease by employing other extreme pressure agents of recognized effectiveness in lubricating greases generally. In this composition without the tricresyl phosphate, equivalent extreme pressure properties are obtained but a black deposit is formed on the bearing races in some of the bearing lubrication tests, particularly in the torque breakdown test.

The data also show the excellent lubricating properties of this grease in the presence of water. In addition to a high resistance to washing away, low water absorption and resistance to penetration change by water absorption, this grease also has a high degree of rust preventiveness as determined by the water washing and rusting test. This test consists essentially in rotating a weighed X–469 Timken roller bearing packed with about 18 grams of the test grease at 500 r.p.m. alternately in air and while it is about 33 percent immersed in water for 2 2-hour periods, and then storing the bearing in a humidified atmosphere for 7 days. At the end of that time the bearing is weighed and inspected. The 44 percent of the grease remaining on the bearing obtained in this test with the grease of our invention is representative of very satisfactory adherence of the grease to the bearing, in addition to the high degree of rust preventiveness obtained.

Obviously many modifications and variations of the invention, as hereinbefore set forth, may be made without departing from the spirit and scope thereof, and therefore only such limitations should be imposed as are indicated in the appended claims.

We claim:
1. A water stable lubricating grease consisting essentially of a mineral lubricating oil as the chief component thickened to a grease consistency with a finely divided hydrophilic carbon black as the sole thickening agent therein, said carbon black having an uncompressed bulk density below about 1 pound of cubic foot, a mean ultimate particle diameter of about 25–45 millimicrons, an ash content above 1.0 percent by weight, a pH in the range 4–6, and a surface area of about 175–750 square meters per gram, and characterized also by the property of settling in water to a maximum concentration from about 0.5 to 1.0 percent by weight.

2. A lubricating grease according to claim 1 wherein the said carbon black has been acid treated to remove at least a substantial proportional of its ash content, the acid treated carbon black having an ash content below about 5 percent.

3. A lubricating grease consisting essentially of a mineral lubricating oil as the chief component thickened to a grease consistency with finely divided carbon black as the sole thickening agent therein and containing about 2–10 percent by weight of a wax oxidate having a neutralization number of at least about 150 and a ratio of neutralization number to saponification number of at least 0.5, and 3–15 percent by weight of a sulfurized fatty oil containing about 5–15 percent by weight of sulphur, said carbon black being a hydrophilic material having an uncompressed bulk density below about 1 pound per cubic foot, a mean ultimate particle diameter of about 25–45 millimicrons, an ash content above 1.0 percent by weight, a pH in the range 4–6 and a surface area above about 120 square meters per gram, and characterized also by the property of settling in water to a maximum concentration from about 0.5 to 1.0 percent by weight, said wax oxidate being a product obtained by reacting a paraffin wax with air at a temperature in the range 200° F.–400° F., under a pressure of about 30–500 pounds per square inch gauge and with an air feed rate of 10–60 cubic feet of air per hour per pound of wax charge until an oxidized product having a neutralization number in about the range 200–550 is obtained.

4. A lubricating grease according to claim 3 containing about 0.5–5 percent by weight of tricresyl phosphate.

References Cited in the file of this patent
UNITED STATES PATENTS

| | | |
|---|---|---|
| 2,467,147 | Morway et al. | Apr. 12, 1949 |
| 2,477,311 | Morway | July 26, 1949 |
| 2,486,674 | Pedersen | Nov. 1, 1949 |
| 2,696,469 | O'Halloran | Dec. 7, 1954 |
| 2,754,267 | Bondi | July 10, 1956 |